(12) United States Patent
Ryu et al.

(10) Patent No.: US 8,352,329 B2
(45) Date of Patent: Jan. 8, 2013

(54) METHOD AND SYSTEM FOR PROVIDING INTERNATIONAL ELECTRONIC PAYMENT SERVICE USING MOBILE PHONE AUTHENTICATION

(75) Inventors: Gung-seon Ryu, Seoul (KR); Ik-seon Ryu, Gyeonggi-do (KR)

(73) Assignee: Danal Co., Ltd., Gyeonggi-Do (KR)

(\*) Notice: Subject to any disclaimer, the term of this patent is extended or adjusted under 35 U.S.C. 154(b) by 418 days.

(21) Appl. No.: 12/642,002

(22) Filed: Dec. 18, 2009

(65) Prior Publication Data
US 2011/0065418 A1 Mar. 17, 2011

(30) Foreign Application Priority Data
Sep. 16, 2009 (KR) .................. 10-2009-0087573

(51) Int. Cl.
*G06Q 30/00* (2006.01)
(52) U.S. Cl. .................. 705/26.35; 705/26.41
(58) Field of Classification Search ............ 705/26–27.2
See application file for complete search history.

(56) References Cited

U.S. PATENT DOCUMENTS 7,664,676 B2 \* 2/2010 Van Do et al. ............... 705/27.1
2002/0062249 A1 \* 5/2002 Iannacci ..................... 705/14
2008/0249930 A1 \* 10/2008 Hill et al. ..................... 705/39
2011/0082767 A1 \* 4/2011 Ryu et al. ................. 705/26.35

OTHER PUBLICATIONS

Aloul; "Two Factor Authentication Using Mobile Phones;" May 10-13, 2009, IEEE, Piscataway, NJ, USA; pp. 641-644.\*

\* cited by examiner

*Primary Examiner* — Adam Levine
(74) *Attorney, Agent, or Firm* — Locke Lord LLP

(57) ABSTRACT

Disclosed herein is a method and system for providing an international electronic payment service using mobile phone authentication. A payment method using an IPN server is selected, and results of verification of the product are relayed to a PG company server in a first country "A." A user in country A enters primary authentication information, and a mobile communication company server performs primary authentication. The mobile phone of the user is then notified of an OTP, and the PG company server in country A receives the OTP and performs secondary authentication. The IPN server vicariously processes a payment between the PG company server and the mobile communication company server, and notifies a PG company server in a second country "B" of results of payment. The mobile communication company server sends paid money to the PG company server in country A, and the PG company server gives money corresponding to product price to the seller.

9 Claims, 4 Drawing Sheets

METHOD AND SYSTEM FOR PROVIDING INTERNATIONAL ELECTRONIC PAYMENT SERVICE USING MOBILE PHONE AUTHENTICATION

CROSS REFERENCE TO RELATED APPLICATIONS

This application claims priority to Korean Patent Application No. 10-2009-0087573, filed on Sep. 16, 2009, the contents of which are incorporated herein in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to a method and system for providing an international electronic payment service, and, more particularly, to a method and system for providing an international electronic payment service using mobile phone authentication, in which an electronic payment agent network server enabling an operation to be performed in cooperation with mobile communication companies all over the world, that is, an International Payment Network (IPN) server, is constructed in order to enable the transactions of products (including content) to be promptly and conveniently conducted between a user and a seller, that is, a content provider (CP), located in different countries, thus allowing the user to pay for products using his or her mobile phone.

2. Description of the Related Art

Recently, interest in electronic payment methods using mobile phones has gradually increased all over the world. The fields of use of electronic payment methods using mobile phones have rapidly extended to payments for the transaction of a variety of products and payments of service fees, as well as payments for Internet content.

In conventional technology, in the case of electronic transactions between a user and a seller located in different countries, international credit cards (for example, VISA, Master-Card, etc.) have been generally used when making payments for the transactions of online content as well as typical products. Moreover, in the case of such international credit cards, since a scheme for prompting a user to personally enter a credit card number and a password is adopted, making a payment is rendered convenient. However, when a credit card number and a password are accidentally leaked to a third party, a serious loss of property and a serious security risk may result. Further, since most transactions using international credit cards are related to transactions of actual products rather than to transactions of content, a problem was pointed out in that commissions for the transactions of various types of content purchased at relatively low cost are comparatively high.

In particular, most of different types of content which are traded online between countries are low-cost items (for example, the price of MP3 music content is below $3 (USD), and the price of movie content is typically below $10 (USD)). The main consumer class is limited to persons in their thirties or younger, and thus a lot of people who do not hold credit cards are distributed in the main consumer class. Therefore, when content is intended to be purchased through online transactions, such international credit cards do not form a large proportion of the used payment means. That is, since online users all over the world do not find payment methods suitable for them, they cannot purchase certain desired products (including product content) online in the majority of cases.

Therefore, markets for international online products (including content) having infinite growth potentiality in the world have emphasized the necessity for an international electronic payment service scheme, which can satisfy the convenience with which users make payments by realizing simpler and more convenient transaction methods, and which can improve the security of making payments through more secure transaction methods.

The inventions disclosed and taught herein are directed to an improved system for providing methods and associated systems for providing international electronic payment services using mobile phone authentication methods.

BRIEF SUMMARY OF THE INVENTION

Accordingly, the present invention has been made keeping in mind the above problems occurring in the prior art, and an object of the present invention is to provide methods and systems for providing an international electronic payment service using mobile phone authentication, in which an International Payment Network (IPN) server operating in cooperation with mobile communication companies around the world is provided in order to enable the transactions of products (including content) to be promptly and conveniently conducted between a user and a seller located in different countries, thus allowing the user to pay for purchased products (including content) using his or her mobile phone.

In accordance with an aspect of the present invention, there is provided a method of providing an international electronic payment service using mobile phone authentication, the method being performed based on a construction in which a computer and a mobile phone of a user in certain first country A, a server of a seller in certain second country B, a mobile communication company server in country A in which the mobile phone of the user is registered, and an International Payment Network (IPN) server for vicariously processing and relaying electronic payments made between the user and the seller in different countries, are connected to each other over a wired and/or wireless communication network between countries all over the world, the method allowing the user to remotely purchase a product through the server of the seller, wherein the method comprises the steps of (a) selecting a payment method, in which the IPN server is used, as means for paying for a product of the seller to be purchased by the user in a first country A, and relaying results of verification of the product to a Payment Gateway (PG) company server in country A through the IPN server; (b) allowing the user in country A to enter primary authentication information, transmitting the primary authentication information to the mobile communication company server via the PG company server in country A, and allowing the mobile communication company server to perform primary authentication of the user based on the primary authentication information; (c) notifying the mobile phone of the user of a One Time Password (OTP) generated by the PG company server in country A, and allowing the PG company server in country A to receive back the OTP and perform secondary authentication of the user; (d) allowing the IPN server to vicariously process a payment made between the PG company server in country A and the mobile communication company server and notify a PG company server in a second country B of results of the payment by relaying the results of the payment to the PG company server in country B, thus prompting the seller in country "B," who confirmed the payment through the PG company server in country B, to provide the product to the user in country A; and (e) allowing the mobile communication company server to send an amount of money, paid by the user in country A, to the PG company server in country A, and allowing the PG company server in country A to give an amount of money corresponding to a price of the product to the seller in country B.

In further accordance with aspects of the present disclosure, step (a) may comprise, when the payment method in which the IPN server is used is selected, a step (a-1) of selecting and designating country A, and inputting information about the product to be purchased.

In accordance with a further, preferred aspect of the present disclosure, the method may further comprise, after step (b), a step (b-1) of transmitting results of the primary authentication performed by the mobile communication company server to the PG company server in country A.

In yet another aspect of the present disclosure, at step (b), the primary authentication information may comprise one or more of a mobile phone number, personal identifier and/or a personal payment information of the user.

In a further aspect of the present disclosure, step (c) may comprise the steps of (c-1) transmitting the OTP generated by the PG company server in country A to the mobile communication company server; and (c-2) notifying the user in country A of the OTP transmitted to the mobile communication company server by transmitting the OTP to the mobile phone of the user in country A using a Short Message Service (SMS) message. In another aspect of the present disclosure, at step (a), the OTP may be implemented as a combination of numbers and/or characters of at least four or more digits.

In further accordance with aspects of the present disclosure, step (d) may comprise the steps (d-1) of allowing the IPN server to vicariously process a payment in country A, allowing the PG company server in country A to request charging from the mobile communication company server, and allowing the mobile communication company server to transmit a response to the request for the charging to the PG company server; step (d-2) of the IPN server notifying the PG company server in country B of results of the payment so as to relay the results of the payment; and step (d-3) of prompting the seller in country B, who confirms the processing of the payment through the PG company server in country B, to provide the product to the user in country A. Preferably, step (d) may further comprise, after step (d-3), the step (d-4) of the PG company server in country B notifying the IPN server of the results of the payment.

In accordance with further aspects of the present disclosure, step (e) may further comprise the step (e-1) of, prior to the PG company server in country A giving the amount of money corresponding to the price of the product to the seller in country B, allowing the PG company server to primarily give a part of the money to the IPN server as a commission and to give a remaining amount of money to the seller.

In accordance with a further aspect of the present disclosure, there is provided a system for providing an international electronic payment service using mobile phone authentication, the system being implemented to perform the methods of providing an international electronic payment service using mobile phone authentication described and detailed herein.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
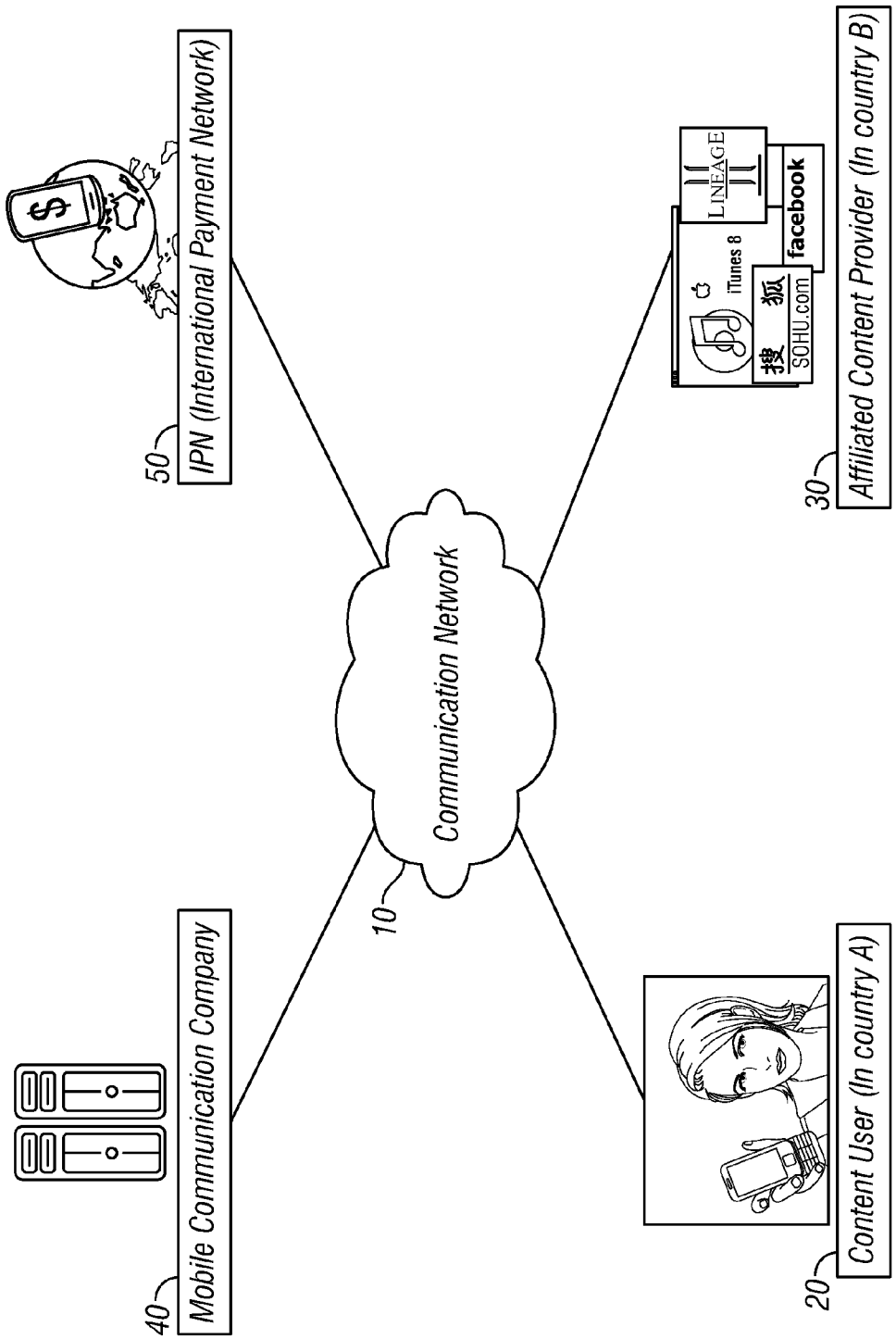
FIG. 1 illustrates a schematic diagram showing an embodiment of a method and system for providing an international electronic payment service using mobile phone authentication according to the present invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Unless the terms used in the present specification are especially defined as different terms, all terms used in the specification, including technical and scientific terms, have the same meanings as those of the terms generally understood by those skilled in the art.

Applicants have created methods and systems for providing an international electronic payment service using mobile phone authentication methods, in order to enable transactions of products (including content) between a user or customer in a first country and a seller in a second country to be promptly and conveniently conducted.

In the description of the present invention, the same reference numerals are used throughout the different drawings to designate the same or similar components for easy understanding of the present invention.

Figure 2:
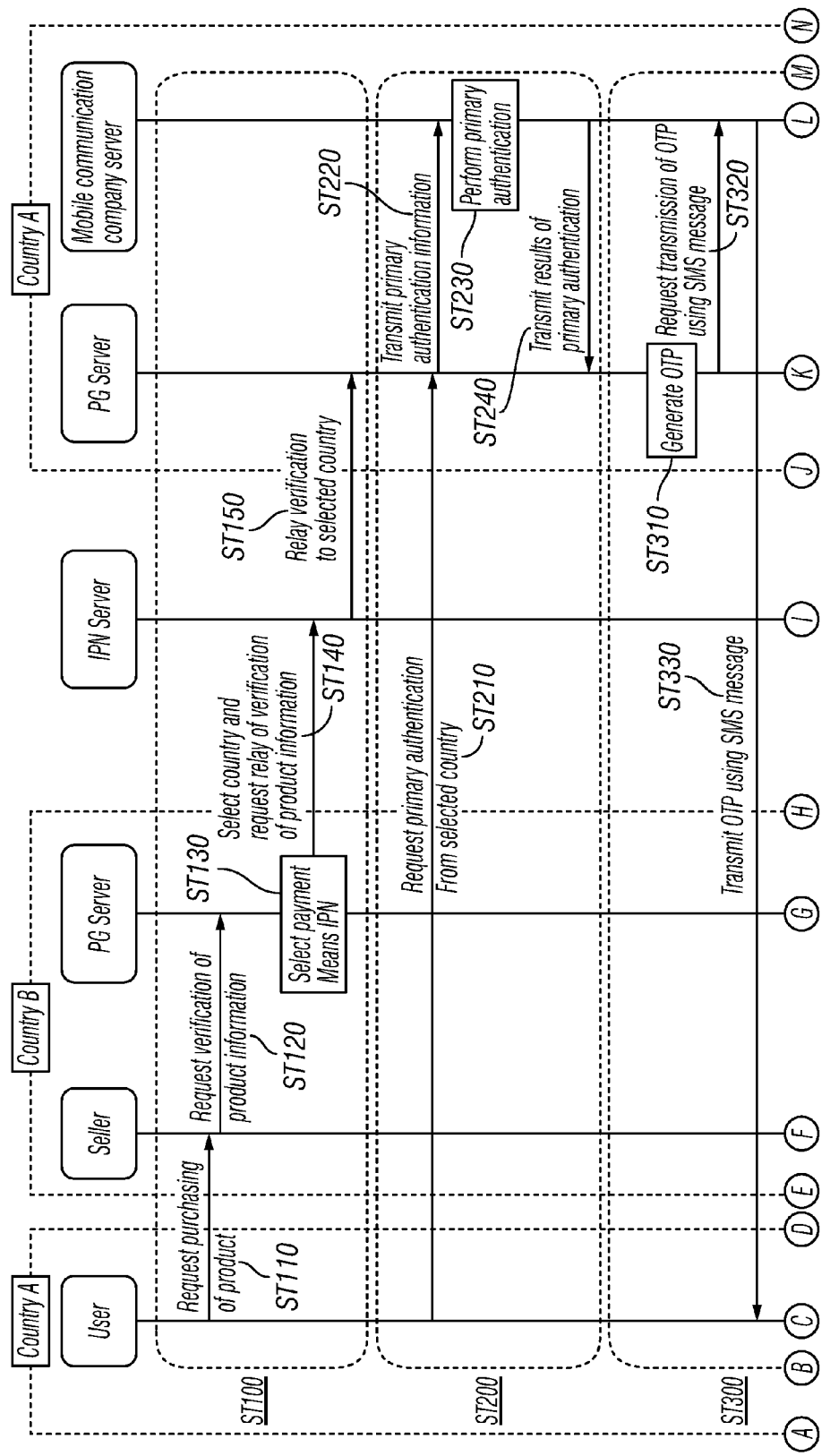
FIG. 2 illustrates a flowchart showing an embodiment of a method of providing an international electronic payment service using mobile phone authentication according to the present invention.
Figure 2:
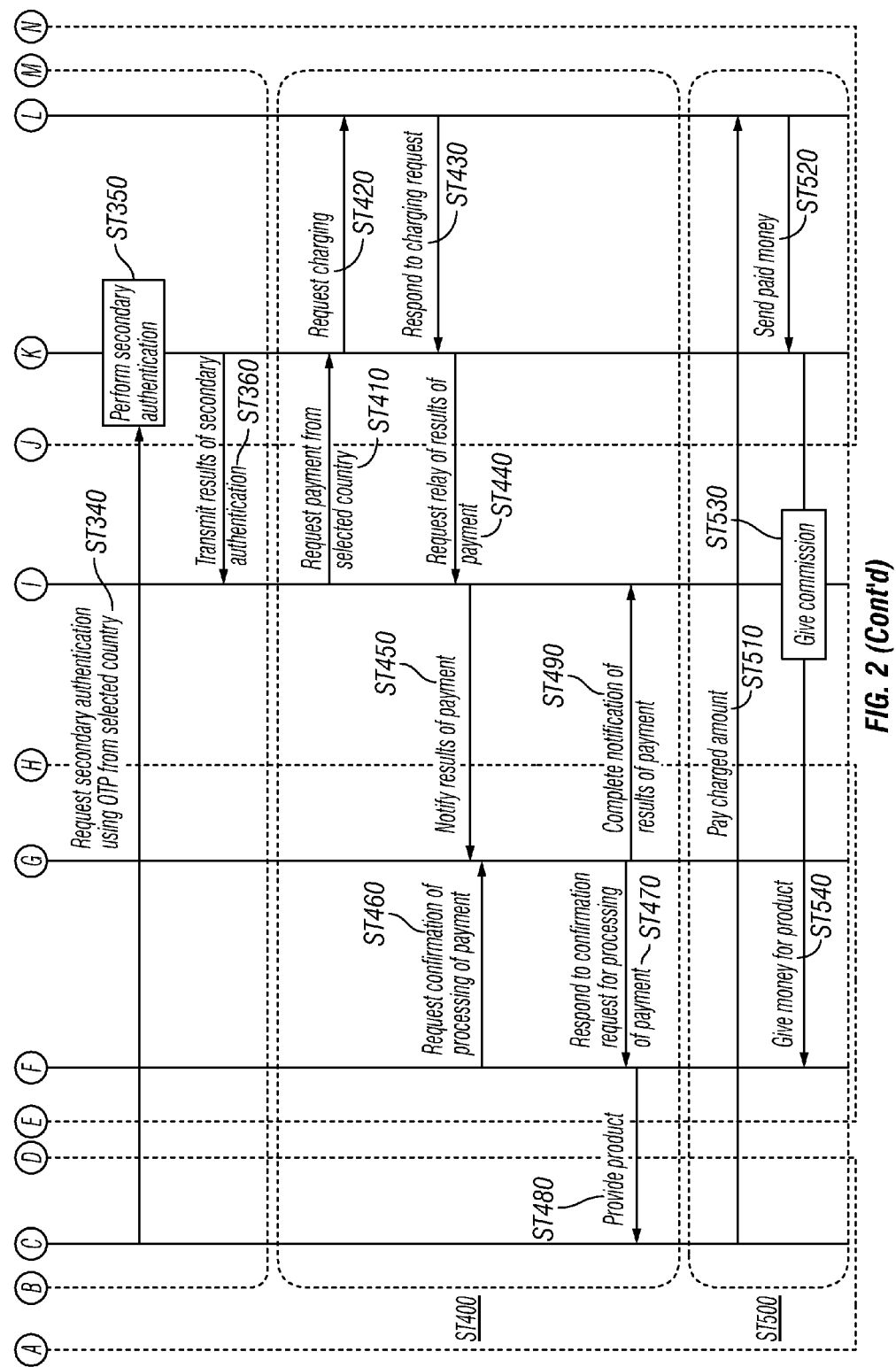
Figure 3:
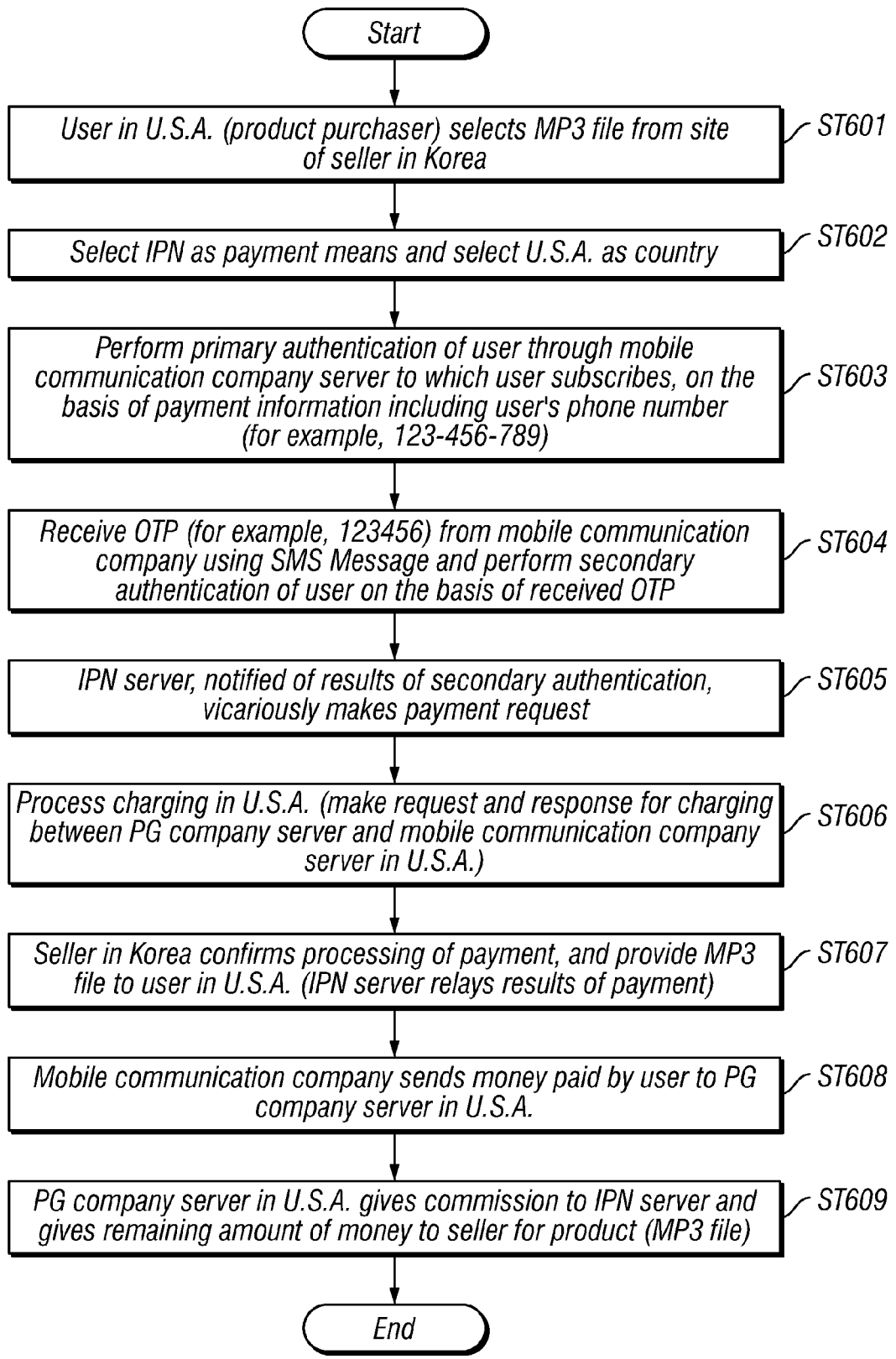
FIG. 3 illustrates a flowchart showing an example of the use of the method of providing an international electronic payment service using mobile phone authentication according to the present invention.

Turning now to the figures, FIG. 1 illustrates a schematic diagram showing an embodiment of a method and system for providing an international electronic payment service using mobile phone authentication according to the present invention, FIG. 2 illustrates a flowchart showing an embodiment of a method of providing an international electronic payment service using mobile phone authentication according to the present invention, and FIG. 3 illustrates a flowchart showing an example of the use of the method of providing an international electronic payment service using mobile phone authentication according to the present invention. These figures will now be discussed in combination.

Referring to FIG. 1, a schematic diagram of a method and system for providing an international electronic payment service using mobile phone authentication according to the present invention is illustrated. As shown in FIG. 1, the present invention has a schematic construction in which a user 20 (including the computer and mobile phone of the user) in a certain first country "A," a seller 30 (including the server of a content provider) in a certain second country "B," a mobile communication company 40 (including a server), and an International Payment Network (IPN) 50 (including an IPN server) are connected to each other via a wired/wireless communication network 10 between countries all over the world.

Here, the mobile communication company 40 refers to a mobile communication company in country A in which the mobile phone of the user is registered, and may also be understood to include the server of the mobile communication company. The IPN 50 refers to a network for vicariously processing international electronic payments made between the user 20 and the seller 30 located in different countries, and may also be understood to be a server which vicariously processes payments or relays the results of the payments between the servers of Payment Gateway (PG) companies in the respective countries.

The method of providing an international electronic payment service using mobile phone authentication according to the present invention will be described below with reference to FIG. 2.

Selection of a Product (Including Content) to be Purchased and Selection of Payment Means (ST100)

First, the method of the present invention includes the step ST100 of selecting a payment method, in which an IPN server is used, as a means for paying for a product which is provided by a seller in country B and will be purchased by a user in country A, and relaying the results of the verification of the product to the server of a PG company in country A through the IPN server.

At the present step ST100, the user in country A selects a product desired to be purchased from a Website provided by the server of the seller in country B, and requests the purchase of the product from the server at step ST110. The seller in country B requests the server of a PG company in country B to verify information about the product at step ST120. The payment method in which the IPN server is used as a means for paying for the product is selected at step ST130. Further, the PG company server in country B transmits information about the country and product selected and entered by the user to the IPN server, and requests the IPN server to relay the results of the verification of product information at step ST140. The IPN server relays the results of the verification to the PG company server in country A at step ST150.

Primary Authentication (ST200)

The method of the present invention includes the step ST200 of allowing the user in country A to enter primary authentication information, transmitting the primary authentication information to the mobile communication company server via the PG company server in country A, and allowing the mobile communication company server to perform primary authentication of the user on the basis of the primary authentication information.

At the present step ST200, the user in country A enters primary authentication information including his or her mobile phone number, personal identifier, and personal payment information, and requests primary authentication from the PG company server in country A at step ST210. The PG company server transmits the primary authentication information to the mobile communication company server at step ST220. The mobile communication company server performs primary authentication of the user on the basis of the received primary authentication information at step ST230. The mobile communication company server notifies the PG company server in country A of the results of the primary authentication by transmitting the results of the primary authentication to the PG company server at step ST240.

Secondary Authentication (ST300)

The method of the present invention includes the step ST300 of notifying the mobile phone of the user in country A of a One Time Password (OTP) generated by the PG company server in country A, and allowing the PG company server in country A to receive the OTP back from the user and to perform secondary authentication of the user.

At the present step ST300 after the performance of primary authentication has been completed at previous step ST200, the PG company server in country A generates an OTP at step ST310. The PG company server transmits the generated OTP to the mobile communication company server in country A while requesting the mobile communication company server to transmit the OTP so as to notify the user in country A of the OTP using a Short Message Service (SMS) message at step ST320.

The mobile communication company server in country A transmits the received OTP to the mobile phone of the user in country A in the form of an SMS message at step ST330. Further, the user in country A, who received the OTP using the SMS message, requests the PG company server in country A to perform secondary authentication of the user while inputting the OTP to the PG company server in country A at step ST340. The PG company server in country A checks the OTP, and then performs secondary authentication of the user at step ST350. After the secondary authentication has been completed, the PG company server in country A transmits the results of the secondary authentication to the IPN server at step ST360.

Here, for the purpose of security, a combination of numbers and/or characters of at least four or more digits may be used as the OTP. In a preferred, non-limiting embodiment, a combination of only numbers of six digits (for example, 123456) may be used as the OTP.

Making of Payment Request, Relay of Payment Results, and Provision of Product (ST400)

The method of the present invention includes the step ST400 of allowing the IPN server to vicariously process the payment made between the PG company server and the mobile communication company server in country A and to notify the PG company server in country B of the results of the payment by relaying the results of the payment to the PG company server in country B, thus prompting the seller in country B, who confirmed the payment through the PG company server in country B, to provide the product to the user in country A.

The IPN server having received the results of the secondary authentication at the previous step ST300 vicariously processes the payment made between the PG company server in country A and the mobile communication company server in country A. First, the IPN server requests the payment from the PG company server in country A at step ST410. Further, the PG company server in country A requests charging from the mobile communication company server at step ST420. The mobile communication company server transmits a response to the charging request to the PG company server in country A at step ST430. The PG company server in country A, having received the response to the charging request, notifies the IPN server of the results of the payment, and requests the IPN server to relay the results of the payment at step ST440.

The IPN server, having received the request for the relay of the results of the payment, notifies the PG company server in country B of the results of the payment at step ST450.

The seller in country B requests the PG company server in country B to confirm the processing of the payment at step ST460. The PG company server in country B, notified of the results of the payment by the IPN server, transmits a response confirming that the processing of the payment has been completed at step ST470. Further, the seller in country B provides the product requested to be purchased to the user in country A at step ST480.

Payment of an Amount of Money, Commission and Product Price (ST500)

The method of the present invention includes the step ST500 of allowing the mobile communication company server to pay an amount of money paid by the user in country A to the PG company server in country A, and allowing the PG company server in country A to pay the price for the product to the seller in country B.

An amount of money corresponding to the price of the provided product is added to the communication fee of the user in country A at the time the communication fee is applied to the mobile phone of the user in country A. This resulting sum of money is charged to the user in country A, and the user in country A pays this charged amount to the mobile communication company at step ST510. The amount of money paid to the mobile communication company is sent to the PG company server in country A at step ST520. The PG company server in country A gives a part of the paid money to the IPN server as a commission at step ST530, and gives the remaining amount of money to the seller in country B for the product at step ST540.

FIG. 3 illustrates a flowchart showing an example of the use of the method of providing an international electronic payment service using mobile phone authentication according to the present invention.

It is assumed, by way of non-limiting example only, that country A in FIG. 2 is the U.S.A., country B in FIG. 2 is Korea, a product to be purchased by the user in the U.S.A. is an mp3 file which is sound source content, the mobile phone number of the user is "123-456-7890," and the OTP is 123456. In this case, and as shown in FIG. 3, the user in the U.S.A. (product purchaser) selects a desired mp3 file from the Website of a seller in Korea at step ST601. The seller in Korea requests a PG company server in Korea to verify information about the product. In this case, the user selects a payment means using the IPN server from a standard payment window, and selects the U.S.A. from a select field for the country at step ST602. Here, the term "selecting from the select field for the country" means the selection of a "country in which the mobile communication company in which the mobile phone of the user is registered is located". In this case, the IPN server relays the results of the verification of the product information to the PG company server in the U.S.A.

The user in the U.S.A. requests the PG company server in the U.S.A. to perform primary authentication by entering payment information including his or her mobile phone number, for example "123-456-7890". The PG company server in the U.S.A. transmits primary authentication information to the mobile communication company server in the U.S.A., and the mobile communication company server performs the primary authentication of the user at step ST603.

When the primary authentication of the user has been completed, the PG company server in the U.S.A. requests the mobile communication company server to transmit an OTP (for example, 123456) to the user in the U.S.A. using an SMS message while transmitting the OTP to the mobile communication company server. In response to such a request, the user in the U.S.A., who received the OTP, transmits the OTP back to the PG company server in the U.S.A., and thus the secondary authentication of the user is performed at step ST604.

The IPN server, having received the results of the secondary authentication, vicariously makes a request for a payment at step ST605. Accordingly, charging is processed in such a way that the PG company server in the U.S.A. requests charging from the mobile communication company server, and the mobile communication company server transmits a response to the charging request to the PG company server in the U.S.A. at step ST606.

The IPN server, having received a request for the relay of the results of the payment, notifies the PG company server in Korea of the results of the payment. The PG company server in Korea transmits a response, confirming that the processing of the payment has been completed, to the seller in Korea when a request for the confirmation of the processing of the payment is received from the seller in Korea. Further, the seller in Korea provides the product requested to be purchased by the user in the U.S.A., that is, the mp3 file, at step ST607.

An amount of money corresponding to the price of the mp3 file is added to the communication fee of the user in the U.S.A. at the time the communication fee is applied to the mobile phone of the user in the U.S.A. This resulting sum of money is charged to the user in the U.S.A., and the user in the U.S.A. pays this charged amount to the mobile communication company at step ST608.

The mobile communication company sends the amount of money, paid by the user, to the PG company server in the U.S.A., and the PG company server in the U.S.A. gives a part of the received money to the IPN server as a commission, and gives the remaining amount of money to the seller in Korea for the mp3 file at step ST609.

In the above construction, the method and system for providing an international electronic payment service using mobile phone authentication according to the present invention has been described.

As described above, the present invention is advantageous in that anyone having a mobile phone can use the products provided by other countries (including such content as mp3 sound sources and movie files) online through an International Payment Network (IPN) server operating in cooperation with mobile communication companies all over the world, and in that the problem of security can be solved through a user authentication procedure performed several times, thus preoccupying exclusive electronic payment methods in online transaction markets having infinite growth potentiality.

Other and further embodiments utilizing one or more aspects of the inventions described above can be devised without departing from the spirit of Applicant's invention. For example, the payment methods used and described herein may be used in electronic payment transactions within a single country, or may involve multiple countries, as appropriate. Further, the various methods and embodiments of the methods and systems described herein can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of providing an international electronic payment service using mobile phone authentication, the method being performed based on a construction in which a computer and a mobile phone of a user in first country A, a server of a seller in second country B, a mobile communication company server in country A in which the mobile phone of the user is registered, and an International Payment Network (IPN) server for vicariously processing and relaying electronic payments made between the user and the seller in different countries, are connected to each other over a wired/wireless communication network between countries all over the world, the method allowing the user to purchase a product through the server of the seller, the method comprising the steps of:

(a) selecting a payment method, in which the IPN server is used, as means for paying for a product of the seller to be purchased by the user in first country A, and relaying results of verification of the product to a Payment Gateway (PG) company server in first country A through the IPN server;

(b) allowing the user in country A to enter primary authentication information, transmitting the primary authentication information to the mobile communication company server via the PG company server in country A, and allowing the mobile communication company server to perform primary authentication of the user based on the primary authentication information;

(c) notifying the mobile phone of the user of a One Time Password (OTP) generated by the PG company server in country A, and allowing the PG company server in country A to receive back the OTP and perform secondary authentication of the user;

(d) allowing the IPN server to vicariously process a payment made between the PG company server in country A and the mobile communication company server and notify a PG company server in a second country B of results of the payment by relaying the results of the payment to the PG company server in country B, thus allowing the seller in country B, who confirmed the payment through the PG company server in country B, to provide the product to the user in country A; and (e) allowing the mobile communication company server to send an amount of money, paid by the user in country A, to the PG company server in country A, and allowing the PG company server in country A to give an amount of money corresponding to a price of the product to the seller in country B.

2. The method according to claim 1, wherein step (a) comprises, when the payment method in which the IPN server is used is selected, a step (a-1) of selecting and designating country A, and inputting information about the product to be purchased.

3. The method according to claim 1, further comprising, after step (b), the step of (b-1) of transmitting results of the primary authentication performed by the mobile communication company server to the PG company server in country A.

4. The method according to claim 1, wherein at step (b), the primary authentication information comprises one or more of a mobile phone number, personal identifier and personal payment information of the user.

5. The method according to claim 1, wherein step (c) further comprises the steps of:
- (c-1) transmitting the OTP generated by the PG company server in country A to the mobile communication company server; and
- (c-2) notifying the user in country A of the OTP transmitted to the mobile communication company server by transmitting the OTP to the mobile phone of the user in country A using a Short Message Service (SMS) message.

6. The method according to claim 1, wherein at step (c), the OTP is implemented as a combination of numbers and/or characters of at least four or more digits.

7. The method according to claim 1, wherein step (d) further comprises the steps of:
- (d-1) allowing the IPN server to vicariously process a payment in country A, allowing the PG company server in country A to request charging from the mobile communication company server, and allowing the mobile communication company server to transmit a response to the request for the charging to the PG company server;
- (d-2) the IPN server notifying the PG company server in country B of results of the payment so as to relay the results of the payment; and
- (d-3) prompting the seller in country B, who confirms the processing of the payment through the PG company server in country B, to provide the product to the user in country A.

8. The method according to claim 7, wherein step (d) further comprises, after step (d-3), the step of (d-4) the PG company server in country B notifying the IPN server of the results of the payment.

9. The method according to claim 1, wherein step (e) comprises the step of (e-1), before the PG company server in country A gives the amount of money corresponding to the price of the product to the seller in country B, allowing the PG company server to primarily give a part of the money to the IPN server as a commission and to give a remaining amount of money to the seller.

* * * * *